US008968580B2

(12) United States Patent
Hann et al.

(10) Patent No.: US 8,968,580 B2

(45) Date of Patent: Mar. 3, 2015

(54) APPARATUS AND METHOD FOR REGULATING FLOW THROUGH A PUMPBOX

(75) Inventors: Thomas Charles Hann, Onoway (CA); William Nicholas Garner, Fort McMurray (CA)

(73) Assignee: Suncor Energy Inc., Calgary (CA)

( * ) Notice: Subject to any disclaimer, the term of this patent is extended or adjusted under 35 U.S.C. 154(b) by 977 days.

(21) Appl. No.: 12/969,380

(22) Filed: Dec. 15, 2010

(65) Prior Publication Data

US 2011/0278240 A1 Nov. 17, 2011

(30) Foreign Application Priority Data

Dec. 23, 2009 (CA) ..................................... 2689021

(51) Int. Cl.

*B03B 1/00* (2006.01)
*C02F 1/24* (2006.01)

(Continued)

(52) U.S. Cl.

CPC ................ *B03D 1/247* (2013.01); *B03D 1/028* (2013.01); *B03D 1/1456* (2013.01); *B03D 1/1468* (2013.01); *B03D 1/1493* (2013.01); *B03D 2203/006* (2013.01)

USPC ........ 210/803; 210/221.1; 210/744; 210/540; 210/739; 210/787; 210/800; 210/804; 210/807; 210/104; 210/107; 210/114; 210/115; 210/703; 208/390; 208/391; 208/424; 208/425; 209/162; 209/163; 209/172; 209/173

(58) Field of Classification Search

CPC .......... C02F 1/38; C02F 1/40; C02F 2103/10; C02F 2103/365; B01D 21/0027; B01D 21/006; B01D 21/0084; B01D 2221/04; B01D 21/30; B01D 21/34; B01D 17/0208; B01D 17/0217; B01D 21/267; B03D 1/02

USPC ......... 210/739, 744, 767, 779, 787, 800, 801, 210/803, 804, 258, 538, 540, 87, 104, 109, 210/137, 114, 115; 209/162, 163, 172, 173; 208/390, 391, 424, 426

See application file for complete search history.

(56) References Cited

U.S. PATENT DOCUMENTS

| | | | | |
|---|---|---|---|---|
| 2,724,503 | A | 11/1955 | Fontein | 209/729 |
| 2,819,795 | A | 1/1958 | Cornelis | 209/732 |

(Continued)

FOREIGN PATENT DOCUMENTS

| | | | |
|---|---|---|---|
| CA | 518320 | 11/1955 | 209/85 |
| CA | 680576 | 2/1964 | 196/18 |

(Continued)

OTHER PUBLICATIONS

Natural Resources Canada, Treatment of Bitumen Froth and Slop Oil Tailings.

(Continued)

*Primary Examiner* — Allison Fitzsimmons
*Assistant Examiner* — Claire Norris
(74) *Attorney, Agent, or Firm* — Knobbe, Martens, Olson & Bear, LLP

(57) ABSTRACT

A pumpbox apparatus includes a reservoir volume having a first inlet for receiving a feedstock stream and a second inlet for receiving a water stream, the reservoir volume being in communication with a discharge outlet disposed to discharge accumulated liquid from the reservoir volume. The reservoir volume is operable to accumulate the feedstock stream and the water stream in the reservoir volume while withdrawing a discharge stream through the discharge outlet to cause a flow of liquid through the pumpbox. The first inlet defines a first flow velocity region between the first inlet and the second inlet and a second flow velocity region between the second inlet and the discharge outlet. The first flow velocity is lower than the second flow velocity to facilitate flotation of a low specific gravity portion of the feedstock through the first region toward an upper surface of the liquid accumulated in the reservoir volume.

45 Claims, 3 Drawing Sheets

(51) Int. Cl.

| | |
|---|---|
| ***B03B 5/62*** | (2006.01) |
| ***B03D 1/24*** | (2006.01) |
| ***B03D 1/02*** | (2006.01) |
| ***B03D 1/14*** | (2006.01) |
| *B03B 9/02* | (2006.01) |
| *B01D 21/24* | (2006.01) |

(56) References Cited

U.S. PATENT DOCUMENTS

| | | | | |
|---|---|---|---|---|
| 2,910,424 | A | 10/1959 | Tek et al. | 208/11 |
| 3,392,105 | A | 7/1968 | Poettmann et al. | 208/11 |
| 3,402,896 | A | 9/1968 | Daman | 241/38 |
| 3,607,720 | A | 9/1971 | Paulson | 208/11 |
| 3,711,238 | A | 1/1973 | Dancy et al. | 431/173 |
| 3,798,157 | A | 3/1974 | Manzanilla et al. | 208/251 |
| 3,808,120 | A | 4/1974 | Smith | 208/11 |
| 3,876,532 | A | 4/1975 | Plundo et al. | 208/216 |
| 3,893,907 | A | 7/1975 | Canevari | 208/11 |
| 3,956,417 | A | 5/1976 | Franz et al. | 260/683.6 |
| 3,962,070 | A | 6/1976 | Stotler | 208/10 |
| 3,967,777 | A | 7/1976 | Canevari | 233/3 |
| 3,971,718 | A | 7/1976 | Reid | |
| 3,972,861 | A | 8/1976 | Gardner, Jr. et al. | 260/123.5 |
| 3,998,702 | A | 12/1976 | Opoku | 196/14.52 |
| 4,017,263 | A | 4/1977 | Holmes et al. | 23/288 |
| 4,033,853 | A | 7/1977 | Hann | 208/11 |
| 4,035,282 | A | 7/1977 | Stuchberry et al. | 208/11 |
| 4,036,664 | A | 7/1977 | Priebe | 127/69 |
| 4,072,609 | A | 2/1978 | Kizior | |
| 4,090,943 | A | 5/1978 | Moll et al. | 208/10 |
| 4,139,646 | A | 2/1979 | Gastrock | 426/430 |
| 4,146,534 | A | 3/1979 | Armstrong | 260/123.5 |
| 4,216,796 | A | 8/1980 | Gastrock | 137/571 |
| 4,257,760 | A | 3/1981 | Schuurman et al. | 431/158 |
| 4,279,743 | A | 7/1981 | Miller | 209/211 |
| 4,282,088 | A * | 8/1981 | Ennis | 209/17 |
| 4,284,360 | A | 8/1981 | Cymbalisty et al. | 366/140 |
| 4,337,143 | A | 6/1982 | Hanson et al. | 208/11 |
| 4,373,325 | A | 2/1983 | Shekleton | 60/39.06 |
| 4,378,289 | A | 3/1983 | Hunter | 209/211 |
| 4,383,914 | A | 5/1983 | Kizior | 208/177 |
| 4,397,741 | A | 8/1983 | Miller | 209/170 |
| 4,399,027 | A | 8/1983 | Miller | 209/164 |
| 4,410,417 | A | 10/1983 | Miller et al. | 208/11 |
| 4,416,620 | A | 11/1983 | Morck | 431/348 |
| 4,470,262 | A | 9/1984 | Shekleton | 60/737 |
| 4,470,899 | A | 9/1984 | Miller et al. | 208/11 |
| 4,486,294 | A | 12/1984 | Miller et al. | 208/11 |
| 4,487,573 | A | 12/1984 | Gottschlich et al. | 431/348 |
| 4,505,811 | A | 3/1985 | Griffiths et al. | 209/13 |
| 4,514,305 | A | 4/1985 | Filby | 210/703 |
| 4,540,484 | A * | 9/1985 | McCarthy | 209/5 |
| 4,545,892 | A | 10/1985 | Cymbalisty et al. | 208/11 |
| 4,556,422 | A | 12/1985 | Reynolds et al. | 75/101 |
| 4,558,743 | A | 12/1985 | Ryan et al. | 166/303 |
| 4,580,504 | A | 4/1986 | Beardmore et al. | 110/261 |
| 4,581,142 | A | 4/1986 | Fladby et al. | 210/512.1 |
| 4,604,988 | A | 8/1986 | Rao | 126/360 |
| 4,744,890 | A | 5/1988 | Miller et al. | 209/164 |
| 4,838,434 | A | 6/1989 | Miller et al. | 209/164 |
| 4,851,123 | A | 7/1989 | Mishra | 210/609 |
| 4,859,317 | A | 8/1989 | Shelfantook et al. | 208/391 |
| 4,914,017 | A | 4/1990 | Mifune | 430/604 |
| 4,994,097 | A | 2/1991 | Brouwers | 55/317 |
| 5,029,557 | A | 7/1991 | Korenberg | 122/149 |
| 5,032,275 | A | 7/1991 | Thew | 210/512.1 |
| 5,035,910 | A | 7/1991 | Jones | 426/478 |
| 5,037,558 | A | 8/1991 | Kalnins | 210/702 |
| 5,039,227 | A | 8/1991 | Leung et al. | 366/137 |
| 5,045,218 | A | 9/1991 | Prendergast et al. | 210/787 |
| 5,055,202 | A | 10/1991 | Carroll et al. | 210/739 |
| 5,062,955 | A | 11/1991 | Sciamanna | 210/512.1 |
| 5,071,556 | A | 12/1991 | Kalnins et al. | 210/512.1 |
| 5,071,557 | A | 12/1991 | Schubert et al. | 210/512.2 |
| 5,073,177 | A | 12/1991 | Brouwers | 55/317 |
| 5,085,577 | A | 2/1992 | Muller | 431/265 |
| 5,090,498 | A | 2/1992 | Hamill | 175/206 |
| 5,110,471 | A | 5/1992 | Kalnins | 210/512.2 |
| 5,118,408 | A | 6/1992 | Jansen et al. | 209/164 |
| 5,123,361 | A | 6/1992 | Nieh et al. | 110/264 |
| 5,143,598 | A | 9/1992 | Graham et al. | 208/390 |
| 5,207,805 | A | 5/1993 | Kalen et al. | 55/1 |
| 5,223,148 | A | 6/1993 | Tipman et al. | 210/744 |
| 5,236,577 | A | 8/1993 | Tipman et al. | 208/390 |
| 5,242,580 | A | 9/1993 | Sury | 208/400 |
| 5,242,604 | A | 9/1993 | Young et al. | 210/768 |
| 5,264,118 | A | 11/1993 | Cymerman et al. | 208/390 |
| 5,302,294 | A | 4/1994 | Schubert et al. | 210/702 |
| 5,316,664 | A | 5/1994 | Gregoli et al. | 208/390 |
| 5,340,467 | A | 8/1994 | Gregoli et al. | 208/390 |
| 5,350,525 | A | 9/1994 | Shaw et al. | 210/744 |
| 5,462,430 | A | 10/1995 | Khinkis | 431/10 |
| 5,556,545 | A | 9/1996 | Volchek et al. | 210/651 |
| 5,572,956 | A | 11/1996 | Hallstrom et al. | 122/247 |
| 5,620,594 | A | 4/1997 | Smith et al. | 210/167 |
| 5,667,543 | A | 9/1997 | Brouwers | 55/317 |
| 5,667,686 | A | 9/1997 | Schubert | 210/512.1 |
| 5,711,374 | A | 1/1998 | Kjos | 166/265 |
| 5,740,834 | A | 4/1998 | Sherowski | 137/527.6 |
| 5,832,846 | A | 11/1998 | Mankowski et al. | 110/345 |
| 5,840,198 | A | 11/1998 | Clarke | 210/802 |
| 5,876,592 | A | 3/1999 | Tipman et al. | 208/390 |
| 5,879,541 | A | 3/1999 | Parkinson | 208/425 |
| 5,958,256 | A | 9/1999 | Ocel, Jr. et al. | 210/800 |
| 5,968,349 | A | 10/1999 | Duyvesteyn et al. | 208/390 |
| 5,996,690 | A | 12/1999 | Shaw et al. | 166/250 |
| 6,036,475 | A | 3/2000 | Matsui et al. | 431/173 |
| 6,077,433 | A | 6/2000 | Brun Henriksen et al. | 210/634 |
| 6,119,870 | A | 9/2000 | Maciejewski et al. | 209/725 |
| 6,167,818 | B1 | 1/2001 | Dejanovich | 110/264 |
| 6,189,613 | B1 | 2/2001 | Chachula et al. | 166/265 |
| 6,190,543 | B1 | 2/2001 | Christiansen | 210/87 |
| 6,197,095 | B1 | 3/2001 | Ditria et al. | 95/248 |
| 6,213,208 | B1 | 4/2001 | Skilbeck | 166/264 |
| 6,315,837 | B1 | 11/2001 | Barclay | 134/10 |
| 6,322,845 | B1 | 11/2001 | Dunlow | 426/629 |
| 6,346,069 | B1 | 2/2002 | Collier | 494/3 |
| 6,378,608 | B1 | 4/2002 | Nilsen et al. | 166/265 |
| 6,398,973 | B1 | 6/2002 | Saunders et al. | 210/788 |
| 6,468,330 | B1 | 10/2002 | Irving et al. | 95/219 |
| 6,543,537 | B1 | 4/2003 | Kjos | 166/266 |
| 6,596,170 | B2 | 7/2003 | Tuszko et al. | 210/512.1 |
| 6,607,437 | B2 | 8/2003 | Casey et al. | 463/16 |
| 6,702,877 | B1 | 3/2004 | Swanborn | 95/269 |
| 6,719,681 | B2 | 4/2004 | Collier | 494/37 |
| 6,730,236 | B2 | 5/2004 | Kouba | 210/806 |
| 6,800,116 | B2 | 10/2004 | Stevens et al. | 95/262 |
| 6,800,208 | B2 | 10/2004 | Bolman | 210/788 |
| 7,011,219 | B2 | 3/2006 | Knox-Holmes et al. | 209/725 |
| 7,060,017 | B2 | 6/2006 | Collier | 494/3 |
| 7,111,738 | B2 | 9/2006 | Allen, III | 209/172 |
| 7,140,441 | B2 | 11/2006 | Hauge et al. | 166/357 |
| 7,141,162 | B2 | 11/2006 | Garner et al. | 210/202 |
| 7,147,788 | B2 | 12/2006 | Tveiten | 210/788 |
| 7,160,518 | B2 | 1/2007 | Chen et al. | 422/147 |
| 7,202,389 | B1 | 4/2007 | Brem | 585/242 |
| 7,223,331 | B2 | 5/2007 | Stark et al. | 208/108 |
| 7,223,344 | B2 | 5/2007 | Zavattari et al. | 210/634 |
| 7,250,140 | B2 | 7/2007 | Chen et al. | 422/144 |
| 7,255,790 | B2 | 8/2007 | Rogers et al. | 210/512.1 |
| 7,261,807 | B2 | 8/2007 | Henry et al. | 208/113 |
| 7,261,870 | B2 | 8/2007 | Coulson et al. | 423/437.2 |
| 7,314,441 | B2 | 1/2008 | Collier | 494/37 |
| 7,316,564 | B2 | 1/2008 | Muschelknautz et al. | 432/16 |
| 7,438,189 | B2 | 10/2008 | Garner et al. | 210/202 |
| 7,438,807 | B2 | 10/2008 | Garner | 210/202 |
| 7,726,491 | B2 | 6/2010 | Garner et al. | |
| 7,736,501 | B2 | 6/2010 | Garner et al. | |
| 8,225,944 | B2 * | 7/2012 | Bjornson et al. | 210/532.1 |
| 2001/0005986 | A1 | 7/2001 | Matsubara et al. | 55/459.1 |
| 2001/0042713 | A1 | 11/2001 | Conrad et al. | 210/512.1 |
| 2001/0047964 | A1 | 12/2001 | Matherly et al. | 210/748 |
| 2002/0018842 | A1 | 2/2002 | Dunlow | 426/630 |

(56) References Cited

U.S. PATENT DOCUMENTS

| | | | | |
|---|---|---|---|---|
| 2002/0068673 | A1 | 6/2002 | Collier | 494/5 |
| 2002/0068676 | A1 | 6/2002 | Collier | 494/37 |
| 2002/0148777 | A1 | 10/2002 | Tuszko | 210/512.1 |
| 2003/0029775 | A1 | 2/2003 | Cymerman et al. | 208/187 |
| 2003/0085185 | A1 | 5/2003 | Kouba | 210/787 |
| 2003/0127387 | A1 | 7/2003 | Aarebrot et al. | 210/634 |
| 2003/0168391 | A1 | 9/2003 | Tveiten | 210/188 |
| 2004/0055972 | A1 | 3/2004 | Garner et al. | 210/787 |
| 2004/0069705 | A1 | 4/2004 | Tuszko et al. | 210/512.1 |
| 2004/0094456 | A1 | 5/2004 | Dries | 208/113 |
| 2004/0140099 | A1 | 7/2004 | Hauge et al. | 166/357 |
| 2004/0182754 | A1 | 9/2004 | Lange | 209/115 |
| 2004/0192533 | A1 | 9/2004 | Collier | 494/74 |
| 2004/0262980 | A1 | 12/2004 | Watson | 299/8 |
| 2005/0016904 | A1 | 1/2005 | Knox-Holmes et al. | 209/590 |
| 2005/0051500 | A1 | 3/2005 | Price et al. | 210/767 |
| 2005/0084812 | A1 | 4/2005 | Rakhmailov et al. | 431/1 |
| 2006/0084022 | A1 | 4/2006 | Kruger | 431/353 |
| 2006/0112724 | A1 | 6/2006 | Chang et al. | 62/470 |
| 2006/0122449 | A1 | 6/2006 | van Egmond | 585/809 |
| 2006/0138036 | A1 | 6/2006 | Garner et al. | 210/202 |
| 2006/0138055 | A1 | 6/2006 | Garnet et al. | 210/703 |
| 2006/0186038 | A1 | 8/2006 | Nassif | 210/512.1 |
| 2006/0217255 | A1 | 9/2006 | Collier | 494/37 |
| 2006/0272983 | A1 | 12/2006 | Droughton et al. | 208/177 |
| 2007/0014905 | A1 | 1/2007 | Chen et al. | 426/490 |
| 2007/0095032 | A1 | 5/2007 | Nilsen et al. | 55/418 |
| 2007/0114489 | A1 | 5/2007 | Powell et al. | 252/187.2 |
| 2007/0138085 | A1 | 6/2007 | Biester | 210/512.1 |
| 2007/0179326 | A1 | 8/2007 | Baker | 585/241 |
| 2007/0180741 | A1 | 8/2007 | Bjornson et al. | 37/403 |
| 2007/0187321 | A1 | 8/2007 | Bjornson et al. | 210/512.3 |
| 2007/0196257 | A1 | 8/2007 | Khattaty et al. | 423/220 |
| 2007/0197845 | A1 | 8/2007 | Beech | 585/639 |
| 2007/0202452 | A1 | 8/2007 | Rao | 431/354 |
| 2008/0000810 | A1 | 1/2008 | Garner et al. | 208/390 |
| 2008/0035586 | A1 | 2/2008 | Chen et al. | 210/788 |
| 2008/0149542 | A1 | 6/2008 | Bjornson et al. | 210/137 |
| 2008/0217212 | A1 | 9/2008 | Garner et al. | 208/390 |
| 2009/0134095 | A1 | 5/2009 | Hann | 210/741 |

FOREIGN PATENT DOCUMENTS

| | | | |
|---|---|---|---|
| CA | 694547 | 9/1964 | 361/34 |
| CA | 741303 | 8/1966 | 196/23 |
| CA | 817869 | 7/1969 | 196/27 |
| CA | 970308 | 7/1975 | 196/17 |
| CA | 970309 | 7/1975 | 196/17 |
| CA | 970310 | 7/1975 | 196/24 |
| CA | 970311 | 7/1975 | 196/30 |
| CA | 971124 | 7/1975 | 196/23 |
| CA | 1005774 | 2/1977 | 196/17 |
| CA | 1026252 | 2/1978 | 196/22 |
| CA | 1059052 | 7/1979 | 196/22 |
| CA | 1066644 | 11/1979 | 196/22 |
| CA | 1071130 | 2/1980 | 196/22 |
| CA | 1072439 | 2/1980 | 158/5 |
| CA | 1072473 | 2/1980 | 196/22 |
| CA | 1076504 | 4/1980 | 196/24 |
| CA | 1097574 | 3/1981 | 182/141 |
| CA | 1117353 | 2/1982 | 992/24.3 |
| CA | 1126187 | 6/1982 | |
| CA | 1138822 | 4/1983 | 209/85 |
| CA | 1152918 | 8/1983 | 196/17 |
| CA | 1194622 | 1/1985 | 361/29 |
| CA | 1201412 | 3/1986 | 204/171 |
| CA | 1228288 | 10/1987 | 165/1 |
| CA | 1248476 | 1/1989 | 196/18 |
| CA | 1254171 | 5/1989 | 204/171.7 |
| CA | 1266250 | 2/1990 | 196/22 |
| CA | 1267860 | 4/1990 | 196/22 |
| CA | 1269063 | 5/1990 | 209/69 |
| CA | 2000984 | 4/1991 | 196/20 |
| CA | 2029795 | 5/1991 | 196/17 |
| CA | 2037856 | 9/1991 | 182/152 |
| CA | 1283465 | 12/1991 | 196/21 |
| CA | 1293465 | 12/1991 | 196/21 |
| CA | 2024756 | 5/1992 | B03B 9/02 |
| CA | 1305390 | 7/1992 | 362/65 |
| CA | 2058221 | 7/1992 | C10G 11/18 |
| CA | 1313845 | 2/1993 | 209/70 |
| CA | 2049178 | 2/1993 | B03B 9/02 |
| CA | 1318273 | 5/1993 | 196/30 |
| CA | 1322177 | 9/1993 | 182/151 |
| CA | 1325180 | 12/1993 | 182/149 |
| CA | 2088227 | 4/1994 | B03B 9/02 |
| CA | 2108521 | 4/1994 | B04C 5/26 |
| CA | 2086073 | 6/1994 | B04C 5/04 |
| CA | 2155198 | 8/1994 | B03D 1/02 |
| CA | 2049793 | 6/1995 | B03B 9/02 |
| CA | 2184613 | 11/1995 | B04C 5/08 |
| CA | 2133911 | 4/1996 | C10G 1/04 |
| CA | 2149737 | 11/1996 | B03B 9/02 |
| CA | 2180686 | 2/1997 | C10G 11/18 |
| CA | 2231543 | 3/1997 | E21B 43/00 |
| CA | 2185256 | 3/1998 | B03B 9/02 |
| CA | 2263691 | 3/1998 | B04C 5/02 |
| CA | 2021185 | 9/1998 | B03B 9/02 |
| CA | 2029756 | 9/1998 | |
| CA | 2200899 | 9/1998 | B03B 9/02 |
| CA | 2249679 | 4/1999 | B03B 9/02 |
| CA | 2308410 | 5/1999 | B04C 3/06 |
| CA | 2236183 | 10/1999 | C10G 1/06 |
| CA | 2269710 | 10/1999 | E21B 43/38 |
| CA | 2246841 | 3/2000 | B03B 9/02 |
| CA | 2365008 | 8/2000 | C10G 11/18 |
| CA | 2262343 | 10/2000 | F23D 5/08 |
| CA | 2298122 | 7/2001 | C02F 1/463 |
| CA | 2090618 | 10/2001 | B04C 5/081 |
| CA | 2358805 | 10/2001 | E21C 41/26 |
| CA | 2311738 | 11/2001 | C10G 1/02 |
| CA | 2409129 | 11/2001 | B01D 17/00 |
| CA | 2315596 | 2/2002 | B03B 9/02 |
| CA | 2332207 | 2/2002 | E21C 41/26 |
| CA | 857306 | 3/2002 | 196/23 |
| CA | 873854 | 3/2002 | 196/23 |
| CA | 882667 | 3/2002 | 196/17 |
| CA | 910271 | 3/2002 | 196/17 |
| CA | 2217300 | 8/2002 | C08L 95/00 |
| CA | 2350001 | 12/2002 | B03B 9/02 |
| CA | 2419325 | 8/2003 | E21B 43/24 |
| CA | 2400258 | 3/2004 | C10C 3/00 |
| CA | 2471048 | 3/2004 | C10B 3/00 |
| CA | 2527058 | 3/2004 | B03B 5/34 |
| CA | 2435113 | 1/2005 | B01D 17/04 |
| CA | 2436158 | 1/2005 | G01N 33/28 |
| CA | 2439436 | 3/2005 | C08L 23/04 |
| CA | 2532737 | 3/2005 | A61L 27/34 |
| CA | 2535702 | 3/2005 | B03B 9/02 |
| CA | 2537603 | 3/2005 | C08L 23/04 |
| CA | 2445645 | 4/2005 | C10G 1/04 |
| CA | 2483896 | 4/2005 | E21B 43/34 |
| CA | 2493677 | 6/2005 | B03B 9/02 |
| CA | 2549895 | 6/2005 | B01F 5/06 |
| CA | 2554725 | 6/2005 | B07B 7/083 |
| CA | 2454942 | 7/2005 | B03B 9/02 |
| CA | 2455623 | 7/2005 | B03B 9/02 |
| CA | 2462359 | 9/2005 | E21B 43/24 |
| CA | 2558424 | 10/2005 | H05B 6/62 |
| CA | 2467372 | 11/2005 | C10G 1/00 |
| CA | 2565980 | 12/2005 | C10G 32/00 |
| CA | 2510099 | 1/2006 | B01F 5/02 |
| CA | 2505449 | 2/2006 | E21B 43/24 |
| CA | 2517811 | 2/2006 | B01D 53/14 |
| CA | 2538464 | 2/2006 | C10C 3/02 |
| CA | 2563922 | 3/2006 | B01J 8/18 |
| CA | 2520943 | 4/2006 | B03B 9/02 |
| CA | 2522031 | 4/2006 | C02F 1/52 |
| CA | 2580836 | 4/2006 | C10G 1/04 |
| CA | 2582078 | 4/2006 | B01D 11/04 |
| CA | 2587866 | 6/2006 | C10G 1/04 |
| CA | 2494391 | 7/2006 | C10B 1/04 |
| CA | 2506398 | 11/2006 | B03B 9/02 |

(56) References Cited

FOREIGN PATENT DOCUMENTS

| | | | | |
|---|---|---|---|---|
| CA | 2547147 | | 11/2006 | C10C 3/02 |
| CA | 2512227 | | 1/2007 | F01K 27/00 |
| CA | 2524995 | | 1/2007 | C10C 3/08 |
| CA | 2559833 | | 1/2007 | E21B 43/248 |
| CA | 2520223 | | 3/2007 | E21B 43/263 |
| CA | 2560223 | | 3/2007 | E21B 36/04 |
| CA | 2524110 | | 4/2007 | B03B 9/02 |
| CA | 2526336 | | 5/2007 | E21C 41/22 |
| CA | 2567644 | | 5/2007 | E21C 41/26 |
| CA | 2567702 | | 5/2007 | B04C 5/24 |
| CA | 2531007 | | 6/2007 | B03B 1/04 |
| CA | 2531262 | | 6/2007 | C10G 45/02 |
| CA | 2570231 | | 6/2007 | C10G 1/04 |
| CA | 2550623 | | 12/2007 | B03B 9/02 |
| CA | 2561539 | | 3/2008 | C02F 1/24 |
| CA | 2610122 | | 5/2008 | B03B 9/02 |
| CA | 2590300 | | 11/2008 | C10G 1/04 |
| CA | 2540561 | | 12/2009 | F23C 3/00 |
| CN | 1112033 | | 11/1995 | |
| CN | 2263552 | Y | 10/1997 | |
| CN | 2520942 | Y | 11/2002 | |
| CN | 1701856 | | 11/2005 | |
| DE | 3202358 | | 8/1983 | |
| DE | 4239501 | | 11/1993 | F23M 9/08 |
| DE | 4432395 | | 3/1996 | F23D 14/02 |
| EP | 0680505 | | 9/1977 | |
| EP | 0021321 | | 1/1981 | F23C 7/00 |
| EP | 0475467 | A1 | 4/1987 | B01D 45/16 |
| EP | 262916 | | 6/1988 | |
| EP | 355127 | | 8/1989 | |
| EP | 0398864 | A2 | 5/1990 | B01D 45/16 |
| EP | 0451343 | A1 | 11/1990 | C10G 1/00 |
| EP | 0522686 | A2 | 1/1993 | B04C 5/13 |
| EP | 332641 | | 3/1994 | B04C 5/081 |
| EP | 0585100 | | 3/1994 | F24H 3/06 |
| EP | 605746 | | 7/1994 | B04C 5/04 |
| EP | 0699867 | | 3/1996 | F23D 14/24 |
| EP | 0734751 | A1 | 10/1996 | B01D 17/02 |
| EP | 0816756 | | 1/1998 | F23D 14/12 |
| EP | 0866268 | | 9/1998 | F23C 7/02 |
| EP | 1028811 | | 8/2000 | B04C 3/06 |
| EP | 1069234 | A1 | 1/2001 | D21D 5/24 |
| EP | 1087055 | A1 | 3/2001 | D21D 5/24 |
| EP | 1166882 | A3 | 7/2003 | B04C 5/081 |
| EP | 1445420 | A2 | 8/2004 | E21B 43/38 |
| EP | 1600215 | | 11/2005 | B04C 3/06 |
| EP | 1501636 | | 8/2006 | B04C 3/00 |
| GB | 195055 | | 1/1924 | |
| GB | 639468 | | 6/1950 | |
| GB | 719379 | | 12/1954 | |
| GB | 719380 | | 12/1954 | |
| GB | 726841 | | 3/1955 | |
| GB | 767944 | | 2/1957 | 91/117 |
| GB | 814610 | | 6/1959 | |
| GB | 1015428 | | 12/1965 | |
| GB | 1234455 | | 6/1971 | F23D 11/00 |
| GB | 1262417 | | 2/1972 | F23D 13/24 |
| GB | 1302064 | | 1/1973 | B01J 1/00 |
| GB | 1425122 | | 2/1976 | F23D 7/00 |
| GB | 2047735 | | 1/1980 | C10G 53/02 |
| GB | 2062840 | | 5/1981 | F23D 15/04 |
| GB | 2075543 | | 11/1981 | C10B 49/10 |
| GB | 2116447 | | 9/1983 | B01D 17/02 |
| JP | 57157951 | | 9/1982 | F24H 1/24 |
| JP | 60251307 | | 12/1985 | F23D 14/02 |
| JP | 61082856 | | 4/1986 | |
| JP | 7004616 | | 1/1995 | F23D 1/02 |
| JP | 11082933 | | 3/1999 | F23D 14/02 |
| RU | 2091668 | | 9/1997 | F23D 14/24 |
| RU | 2154234 | | 8/2000 | F23C 5/24 |
| UA | 79967 | | 8/2007 | F23C 1/00 |
| WO | WO9115712 | | 10/1991 | F22B 37/10 |
| WO | WO 92/04123 | | 3/1992 | B04C 5/081 |
| WO | WO 94/23823 | | 10/1994 | B01D 45/14 |
| WO | WO9610716 | | 4/1996 | F22B 5/00 |
| WO | WO 00/74815 | | 12/2000 | B01D 45/18 |
| WO | WO 03/068407 | | 8/2003 | B04C 5/08 |
| WO | WO 03/092901 | | 11/2003 | B04C 3/00 |
| WO | WO 2004/005673 | | 1/2004 | E21B 43/40 |
| WO | WO2005/044871 | | 5/2005 | C08F 10/00 |
| WO | WO 2006/085759 | | 8/2006 | B04C 3/00 |
| WO | WO2006/132527 | | 12/2006 | B01D 45/12 |
| WO | WO2007/001174 | | 1/2007 | B01D 19/00 |
| WO | WO2007/021181 | | 2/2007 | B01D 17/02 |
| WO | WO2007081816 | | 7/2007 | C10L 1/12 |

OTHER PUBLICATIONS

National Energy Board, Canada's Oil Sands: A Supply and Market Outlook to 2015, An Energy Market Assessment Oct. 2000.
Krebs' Engineers, Krebs D-Series gMax DeSanders for Oil and Gas, Bulletin 11-203WEL.
Eva Mondt "Compact Centrifugal Separator of Dispersed Phases" Proefschrift.
Industry Statistics "Monthly Petroleum Facts at a Glance" Jan. 2002 pp. 1-2.
IEO 1997 World Oil Markets "The World Oil Markey" pp. 1-19.
Rimmer, Gregoli and Yildlrim, "Hydrocyclone-based Process for Rejecting Solids from Oil Sands at the Mine Site While Retaining Bitumen for Transportation to a Processing Plant"; Suncor Extraction 3rd fl pp. 93-100, Paper delivered on Monday Apr. 5, 1993 at a conference in Alberta, Canada entitled "Oil Sands-Our Petroleum Future".
Demco Cyclone Separators Catalog CI-78, Aug. 15, 1978.
Facts about liquid cyclones. Where to use them. Where not to use them. And how to specify the right cyclone for the job. With special emphasis on the DORRCLONE, 1979, Dorr-Oliver Inc.
Office Action dated Nov. 11, 2005 for U.S. Appl. No. 10/306,003 (issued as patent US 7,141,162).
Notice of Allowability dated Feb. 15, 2006 for U.S. Appl. No. 10/306,003 (issued as patent US 7,141,162).
Office Action dated Sep. 14, 2006 for U.S. Appl. No. 11/486,302.
Office Action dated Mar. 23, 2007 for U.S. Appl. No. 11/486,302.
Office Action dated Nov. 20, 2007 for U.S. Appl. No. 11/486,302.
Notice of Allowability dated Aug. 21, 2008 [issued as patent US 7,438,807 on Oct. 21, 2008].
Office Action dated Mar. 22, 2007 for U.S. Appl. No. 11/360,597.
Office Action dated Nov. 20, 2007 for U.S. Appl. No. 11/360,597.
Office Action dated Mar. 20, 2007 for U.S. Appl. No. 11/360,489.
Office Action dated Nov. 19, 2007 for U.S. Appl. No. 11/360,489.
Notice of Allowability dated Jun. 13, 2008 [issued as patent US 7438189 on Oct. 21, 2008].
Office Action dated Jun. 24, 2009 for U.S. Appl. No. 11/759,151.

* cited by examiner

APPARATUS AND METHOD FOR REGULATING FLOW THROUGH A PUMPBOX

BACKGROUND OF THE INVENTION

1. Field of Invention

This invention relates generally to processing of a feedstock and more particularly to a pumpbox for receiving a hydrocarbon feedstock.

2. Description of Related Art

Hydrocarbon feedstocks are generally viscous and may be entrained with other components such as rock, sand, clay and other minerals. As a result, such feedstocks require processing to separate useful hydrocarbon products from residue before transport and refining.

One example of a hydrocarbon ore deposit is the Northern Alberta oil sands, which comprises about 70 to about 90 percent by weight of mineral solids including sand and clay, about 1 to about 10 percent by weight of water, and a bitumen or oil film. The bitumen may be present in amounts ranging from a trace amount up to as much as 20 percent by weight. Due to the highly viscous nature of bitumen, when excavated some of the ore may remain as clumps of oversize ore that requires sizing to produce a sized ore feed suitable for processing. The ore may also be frozen due to the northerly geographic location of many oil sands deposits, making sizing of the ore more difficult. The sized ore feed is typically processed by adding water to form a slurry in a location proximate to the ore deposit, and the resulting slurry is hydrotransported through a pipeline to a processing plant, where the slurry forms the feedstock for a processing plant that separates hydrocarbon products from the sand and other minerals.

Low specific gravity hydrocarbons such as bitumen froth may be separated from sand and water, which generally have higher specific gravity, by various gravity separation processes. There remains a need for improved processes and apparatus for treating heavy hydrocarbon feedstocks.

SUMMARY OF THE INVENTION

In accordance with one aspect of the invention there is provided a pumpbox apparatus. The apparatus includes a reservoir volume having a first inlet for receiving a feedstock stream and a second inlet for receiving a water stream, the reservoir volume being in communication with a discharge outlet disposed to discharge accumulated liquid from the reservoir volume. The reservoir volume is operable to accumulate the feedstock stream and the water stream to a first liquid level in the reservoir volume while withdrawing a discharge stream through the discharge outlet to cause a flow of liquid through the pumpbox. The first inlet is located above the second inlet and defines a first flow velocity region between the first inlet and the second inlet and a second flow velocity region between the second inlet and the discharge outlet. The first flow velocity is lower than the second flow velocity to facilitate flotation of a low specific gravity portion of the feedstock through the first region toward an upper surface of the liquid accumulated in the reservoir volume. The apparatus also includes a collector for collecting at least a portion of the low specific gravity portion from an upper surface of the accumulated volume when the first liquid level is above the first inlet.

The apparatus may include a controller for controlling a flow rate through the discharge outlet to maintain the first liquid level at a level between the first inlet and a high liquid level, the high liquid level being a desired maximum operating level for the reservoir volume.

The collector may be operably configured to collect at least a portion of the low specific gravity portion from an upper surface of the accumulated volume when the first liquid level reaches a high liquid level.

The collector may include a launder having an inlet disposed in the reservoir volume at the high liquid level for receiving an overflow of the low specific gravity portion from the reservoir volume.

The reservoir volume may be selected to maintain a retention time of feedstock and water in the pumpbox in the range of about 30 seconds to about several minutes at an expected average flow rate of the feedstock stream and the water stream. In one arrangement, the retention time is about 1 minute.

The apparatus may include a discharge pump in communication with the discharge outlet for withdrawing the discharge stream from the discharge outlet.

The discharge pump may be operably configured to discontinue operation when the liquid level reaches a low liquid level.

The apparatus may include a controller operably configured to control operation of the discharge pump in response to receiving a liquid level signal representing an accumulation level of liquid in the reservoir volume.

The feedstock stream may include bitumen. In one embodiment, the feedstock stream comprises bitumen froth. In another embodiment, the bitumen froth is in the form of an aerated froth. In another variation, the feedstock stream comprises bitumen froth in the form of a highly aerated bitumen froth. Highly aerated bitumen froths tend to float fast. Advantageously, in one aspect of the invention, the vessel is operative to selectively separate out such a fast floating aerated bitumen froth.

The feedstock stream may include water and solids.

The water stream may include a re-circulated water stream.

The re-circulated water stream may include residual bitumen and solids.

The second inlet may be disposed to cause solids that settle out of the accumulated liquid volume to be dispersed toward the discharge outlet for discharge in the discharge stream.

The second inlet may be oriented to direct the water stream received at the second inlet generally towards the discharge outlet.

The pumpbox may include a base having portion that may be inclined to direct solids that settle out of the accumulated liquid volume toward the discharge outlet for discharge in the discharge stream.

A density of the discharge stream may be between about $122\times10^{1}$ and about $128\times10^{1}$ kg/m3.

The flow velocity in the first flow velocity region may be less than about $5\times10^{-2}$ meters per second.

In accordance with another aspect of the invention there is provided a pumpbox apparatus. The apparatus includes a reservoir volume having a first inlet for receiving a feedstock stream and a second inlet for receiving a water stream, the reservoir volume being in communication with a discharge outlet disposed to discharge accumulated liquid from the reservoir volume. The reservoir volume is operable to accumulate the feedstock stream and the water stream to a first liquid level in the reservoir volume while withdrawing a discharge stream through the discharge outlet to cause a flow of liquid through the pumpbox. The first inlet is located above the second inlet and defines a first flow velocity region between the first inlet and the second inlet and a second flow velocity region between the second inlet and the discharge outlet, the first flow velocity being lower than the second flow velocity to facilitate flotation of a low specific gravity portion of the feedstock through the first region toward an upper surface of the liquid accumulated in the reservoir volume. The apparatus also includes provisions for collecting at least a portion of the low specific gravity portion from an upper surface of the accumulated volume when the first liquid level is above the first inlet.

The apparatus may include provisions for controlling a flow rate through the discharge outlet to maintain the first liquid level at a level between the first inlet and a high liquid level, the high liquid level being a desired maximum operating level for the pumpbox.

The provisions for collecting may include provisions for collecting at least a portion of the low specific gravity portion from an upper surface of the accumulated volume when the first liquid level reaches a high liquid level.

The provisions for controlling may include provisions for controlling a flow rate through the discharge outlet to maintain a retention time of the feedstock stream and water stream in the reservoir volume of about 1 minute.

The apparatus may include provisions for causing solids that settle out of the accumulated liquid volume to be dispersed toward the discharge outlet for discharge in the discharge stream.

A density of the discharge stream may be between about $122\times10^1$ and about $128\times10^1$ kg/m3.

The flow velocity in the first flow velocity region may be less than about $5\times10^{-2}$ meters per second.

In accordance with another aspect of the invention there is provided a method for regulating flow through a pumpbox having a reservoir volume in communication with a discharge outlet disposed to discharge accumulated liquid from the reservoir volume. The method involves receiving a feedstock stream at a first inlet of the reservoir volume, receiving a water stream at a second inlet of the reservoir volume, and accumulating the feedstock stream and the water stream to a first liquid level in the reservoir volume while withdrawing a discharge stream through the discharge outlet to cause a flow of liquid through the pumpbox. The first inlet is located above the second inlet and defines a first flow velocity region between the first inlet and the second inlet and a second flow velocity region between the second inlet and the discharge outlet, the first flow velocity being lower than the second flow velocity to facilitate flotation of a low specific gravity portion of the feedstock through the first region toward an upper surface of the liquid accumulated in the reservoir volume. The method further involves collecting at least a portion of the low specific gravity portion from an upper surface of the accumulated volume when the first liquid level is above the first inlet.

The method may involve controlling a flow rate through the discharge outlet to maintain the first liquid level at a level between the first inlet and a high liquid level, the high liquid level being a desired maximum operating level for the reservoir volume.

Collecting may involve collecting at least a portion of the low specific gravity portion from an upper surface of the accumulated volume when the first liquid level reaches a high liquid level.

Collecting may involve causing the low specific gravity portion to overflow into a launder having an inlet disposed in the reservoir volume at the high liquid level.

Withdrawing the discharge stream may involve operating a discharge pump in communication with the discharge outlet.

The method may involve discontinuing operation of the discharge pump when the liquid level reaches a low liquid level.

The method may involve controlling operation of the discharge pump in response to receiving a liquid level signal representing an accumulation level of liquid in the reservoir volume.

The method may involve causing solids that settle out of the accumulated liquid volume to be dispersed toward the discharge outlet for discharge in the discharge stream.

Causing solids that settle out of the accumulated liquid volume to be dispersed may involve directing the water stream received at the second inlet generally towards the discharge outlet.

A density of the discharge stream may be between about $122\times10^1$ and about $128\times10^1$ kg/m3.

The flow velocity in the first flow velocity region may be less than about $5\times10^{-2}$ meters per second.

In accordance with one aspect of the invention there is provided a system for extracting bitumen from a feedstock. The system includes a pumpbox including a reservoir volume having a first inlet for receiving a feedstock stream including bitumen and a second inlet for receiving a water stream. The reservoir volume is in communication with a discharge outlet disposed to discharge accumulated liquid from the reservoir volume. The reservoir volume is operable to accumulate the feedstock stream and the water stream to a first liquid level in the reservoir volume while withdrawing a discharge stream through the discharge outlet to cause a flow of liquid through the pumpbox. The first inlet is located above the second inlet and defines a first flow velocity region between the first inlet and the second inlet and a second flow velocity region between the second inlet and the discharge outlet. The first flow velocity is lower than the second flow velocity to facilitate flotation of at least a portion of the bitumen through the first region toward an upper surface of the liquid accumulated in the reservoir volume. The system also includes a first hydrocyclone having a feed inlet, an overflow discharge outlet for producing a first product stream, and an underflow discharge outlet, the feed inlet of the first hydrocyclone being in communication with the discharge outlet of the pumpbox for receiving the discharge stream from the pumpbox. The system further includes a second hydrocyclone having a feed inlet, an overflow discharge outlet, and an underflow discharge outlet for producing a first tailings stream, the feed inlet of the second hydrocyclone being in communication with the underflow discharge outlet of the first hydrocyclone. The overflow discharge outlet of the second hydrocyclone is in communication with the second inlet of the pumpbox for providing the water stream to the pumpbox. The pumpbox further includes a collector for collecting at least a portion of the low specific gravity bitumen portion from an upper surface of the accumulated volume when the first liquid level is above the first inlet to produce a second product stream, the second product stream being combined with the first product stream to produce a system product stream.

The system may include a third hydrocyclone having a feed inlet, an overflow discharge outlet, and an underflow discharge outlet, the feed inlet of the third hydrocyclone being in communication with the underflow discharge outlet of the second hydrocyclone for receiving the first tailings stream, the third hydrocyclone being operable to produce a second tailings stream at the underflow discharge outlet of the second hydrocyclone, the overflow discharge outlet of the third hydrocyclone being in communication with the feed inlet of the second hydrocyclone to provide an additional feed to the second hydrocyclone.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
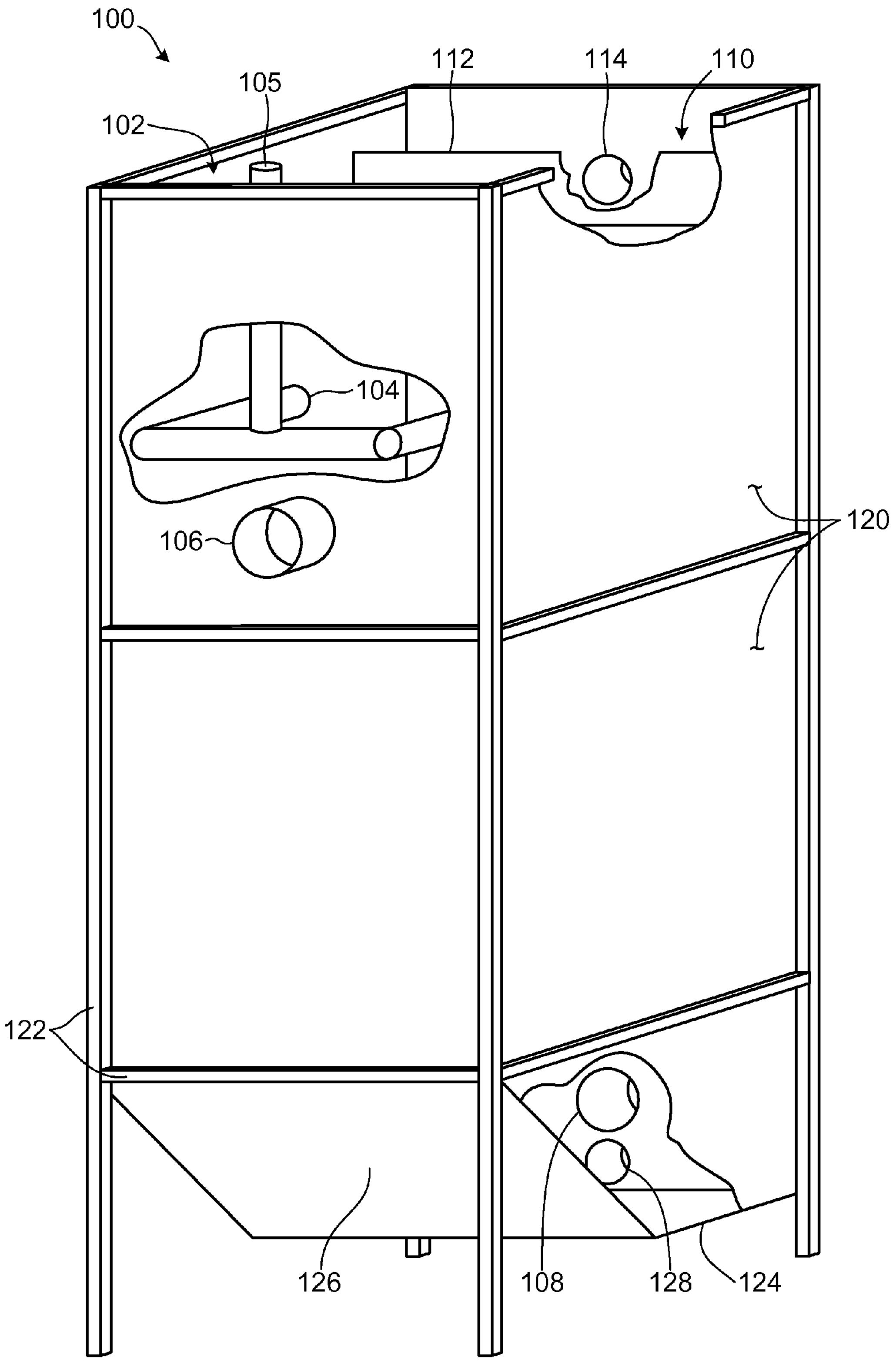
FIG. 1 is a perspective partially cut-away view of a pumpbox apparatus in accordance with a first embodiment of the invention.

Referring to FIG. 1, a pumpbox apparatus according to a first embodiment of the invention is shown generally at 100. The pumpbox apparatus 100 includes a reservoir volume 102 having a first inlet 104 for receiving a feedstock stream and a second inlet 106 for receiving a water stream. The reservoir volume 102 is in communication with a discharge outlet 108 disposed to discharge accumulated liquid from the reservoir volume. The reservoir volume 102 is operable to accumulate the feedstock stream received at the first inlet 104 and the water stream received at the second inlet 106 to a first liquid level in the reservoir volume while withdrawing a discharge stream through the discharge outlet 108 to cause a flow of liquid through the pumpbox apparatus 100. In one embodiment the density of the discharge stream may be between about $122\times10^{1}$ and about $128\times10^{1}$ kg/m3.

Figure 2:
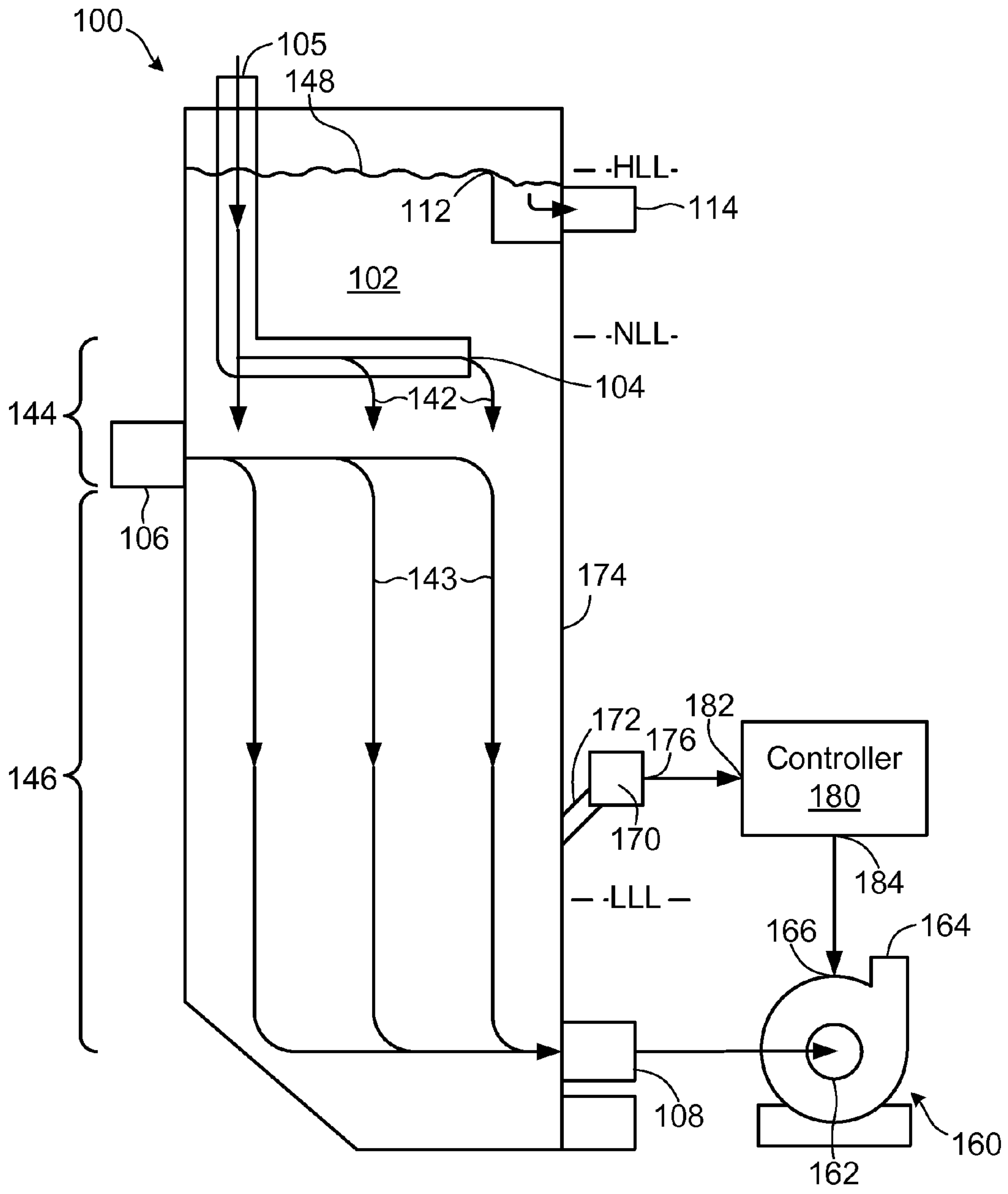
FIG. 2 is a side schematic view of the pumpbox shown in FIG. 2.

The first inlet 104 is located above the second inlet 106. In this embodiment the first inlet 104 is in communication with a feed conduit 105, which is receives the feedstock stream, and directs the stream to the first inlet 104. The pumpbox apparatus 100 is shown in side schematic view in FIG. 2. Referring to FIG. 2, the feedstock stream received at the first inlet 104 and the water stream received at the second inlet 106 cause respective flows 142 and 143 in the reservoir volume 102. A first flow velocity region 144 is defined between the first inlet 104 and the second inlet 106. A second flow velocity region 146 is defined generally between the second inlet 106 and the discharge outlet 108. A first flow velocity in the first region 144 is lower than a second flow velocity in the second region 144, which facilitates flotation of a low specific gravity portion of the feedstock through the first region 144 toward an upper surface 148 of the liquid accumulated in the reservoir volume 102.

The flow through the first and second flow velocity regions 144 and 146 is generally in a downwards direction and in one embodiment where the feedstock stream comprises bitumen, the first flow velocity is less than about $5\times10^{-2}$ meters per second, which permits a fast rising bitumen portion to float upwardly in the reservoir volume 102. Referring back to FIG. 1, the pumpbox apparatus 100 further includes a collector 110 for collecting at least a portion of the low specific gravity portion of the feedstock from the upper surface 148 when the first liquid level is above the first inlet 104.

In the embodiment shown in FIG. 2, the pumpbox apparatus 100 further includes a discharge pump 160. The discharge pump 160 includes an inlet 162 in communication with the discharge outlet 108 for withdrawing the discharge stream from the pumpbox. The pump 160 also has an outlet 164, which may be coupled to a conduit for conveying the discharged stream for further processing. The pump 160 also includes the control input 166 for receiving a pump control signal for controlling operation of the pump.

In the embodiment shown in FIG. 1 and FIG. 2 the collector 110 is configured as a launder having an overflow inlet 112 and a product outlet 114 for producing a product stream. When the first liquid level in the reservoir volume 102 reaches the level of the inlet 112 the lower specific gravity portion which accumulates at the upper surface 148 overflows into the launder and is discharged through the product outlet 114. Referring back to FIG. 2, the overflow inlet 112 thus defines a high liquid level (HLL) for the reservoir volume 102.

In this embodiment, the apparatus 100 also includes a liquid level sensor 170 and an opening 172 in a sidewall 174 of the pumpbox, which permits sensing of the first liquid level in the reservoir volume 102. The level sensor 170 includes an output 176 for producing a level signal representing a liquid level in the reservoir volume 102. The apparatus 100 further includes a controller 180 having an input 182 for receiving the level signal from the output 176 of the level sensor 170. The controller 180 also includes an output 184 for producing the pump control signal for controlling operation of the pump 160. In one embodiment, the control signal received at the input 166 of the pump 160 may be an analog signal that controls a speed of the pump, and thus the discharge flow rate through the discharge outlet 108. In other embodiments, the control signal may be a signal having one of two states, including a first state for causing the pump 160 to operate, and a second state for causing the pump to discontinue operation.

Referring back to FIG. 1, in the illustrative embodiment the pumpbox apparatus includes a plurality of sidewalls 120 supported by a frame 122, a base 124, and a back plate 126, which together define the reservoir volume 102. The back plate 126 is inclined at an angle to the base 124 to cause solids that settle out from the accumulated liquid to be generally directed toward the discharge outlet 108. The apparatus 100 may also include a drain outlet 128 located below the discharge outlet 108. The drain outlet facilitates periodic or selective flushing of the pumpbox for inspection of the apparatus. Note that while the pumpbox apparatus may have a rectangular outline, curved surfaces may be used in connection with the apparatus in another variation to provide further structural strength.

The feedstock stream received at the first inlet 104 may be an oil sand slurry including mineral solids such as sand and clay, water, and a bitumen froth. Preferably, the feedstock stream includes a highly aerated bitumen froth. Highly aerated bitumen froth tends to float fast. Advantageously, in one aspect of the invention, the pumpbox apparatus is operative to selectively separate out such a fast floating aerated bitumen froth.

In one embodiment the upstream oil sand flow rate of an oil sand feed may be in the range of about 1000 and about 6000 tonnes per hour. The oil sand feed is diluted with water (e.g. process water) to produce a slurry having densities in the range of about 1400 kg/m3 to about 1650 kg/m3, which is received at the first inlet 104. The water stream received at the second inlet 106 may be re-circulated process water, which may include dispersed solids and at least some residual bitumen.

During operation of the pumpbox apparatus 100, the feedstock stream and the water stream accumulate in the reservoir volume 102 while the controller 180 monitors the liquid level signal produced by the level sensor 170. When the first liquid level reaches the low liquid level (indicated as LLL in FIG. 2), the controller 180 responds by changing the state of the pump control signal produced at the output 184, which in turn causes the discharge pump 160 to be activated to cause accumulated liquid in the reservoir volume 102 to be discharged through the discharge outlet 108. As the first liquid level in the reservoir volume 102 continues to rise, the controller 180 may respond by increasing the speed of the discharge pump 160 to increase the discharge flow rate through the discharge outlet 108. When the first liquid level reaches the level of the first inlet 104, the first and second flow velocity regions 144 and 146 are established. Volumetric flow rates through the pumpbox apparatus 100 may be written as follows:

$$Q_D = Q_1 + Q_2 \quad \text{Eqn 1}$$

where $Q_D$ is the volumetric flow rate through the discharge outlet 108, $Q_1$ is the volumetric flow rate in the first region 144, and $Q_2$ is the volumetric flow rate through the second region 146. Assuming a downwardly vertical flow, the volumetric flow rate in the first region 144 may be written as:

$$Q_1 = Av_1 \quad \text{Eqn 2}$$

where A is the cross-sectional area of the reservoir volume 102, $v_1$ is the flow velocity in the first region 144. Rearranging and substituting Eqn 2 into Eqn 1 gives:

$$Q_2 = Q_D - Av_1 \quad \text{Eqn 3}$$

For example, at a discharge rate of 2000 $m^3$/hour through the discharge outlet 108 in a vessel having a cross-sectional area of 8 $m^2$, in order to maintain a velocity $v_1$ of $5\times10^{-2}$ meters per second, the flow rate through the second inlet 106 should be about 560 $m^3$/hour. Under these conditions a velocity $v_2$ in the second region 146 would be about $7\times10^{-2}$ meters per second. Advantageously, the reduced first flow velocity $v_1$ in the first region 144 facilitates flotation of the low specific gravity portion of the feedstock through the first region 144 to the upper surface 148. Equations 1-3 above are derived under assumption of vertically downward flow. In practice, flow paths through the apparatus 100 will have portions that are not vertically downward. It should thus be appreciated that for accurate calculation the above analysis would need to be applied to actual flow paths through the apparatus.

In the embodiment shown, collection of the low specific gravity portion of the feedstock that floats to the upper surface 148 occurs when the first liquid level in the reservoir volume 102 reaches the level of the overflow inlet 112 of the collector 110. The overflow inlet 112 therefore defines a high liquid level (HLL) for operation of the pumpbox apparatus 100. Generally, while it may be desirable to always operate the pumpbox apparatus 100 at the HLL in order to facilitate continuous collection of the low specific gravity portion of the feedstock, in practice variations in flow rate of the feedstock stream through the first inlet 104 would necessarily result in deviations from HLL that would require periodic intervention by an operator to adjust the discharge flow rate $Q_D$ and/or the flow rate $Q_2$ of the water stream. Practically, the operator would seek to maintain the first liquid level in the reservoir volume 102 between a normal liquid level (NLL) located at or above the first inlet 104 and the HLL. The NLL assumes liquid densities are about a nominal fluid density. Aerated bitumen froth, due to the air content, has a lower density hence a higher level than the nominal fluid. Aerated bitumen froth may have a density ranging from about 600 kg/m3 to about 1000 kg/m3.

While the first liquid level is maintained between NLL and HLL and the velocity $v_1$ is maintained below less than about $5\times10^{-2}$ meters per second, favorable conditions for flotation of the low specific gravity portion of the feedstock exists and bitumen should accumulate at the upper surface. When the first liquid level is above NLL but below HLL, bitumen may accumulate, but would not be collected. Accumulated bitumen is collected when the various flows permit the first liquid level in the reservoir volume to rise to the HLL. In one embodiment the discharge pump 160 is operated to maintain the first liquid level at an average liquid level of about 75% of the vertical distance between NLL and HLL above the NLL.

Figure 3:
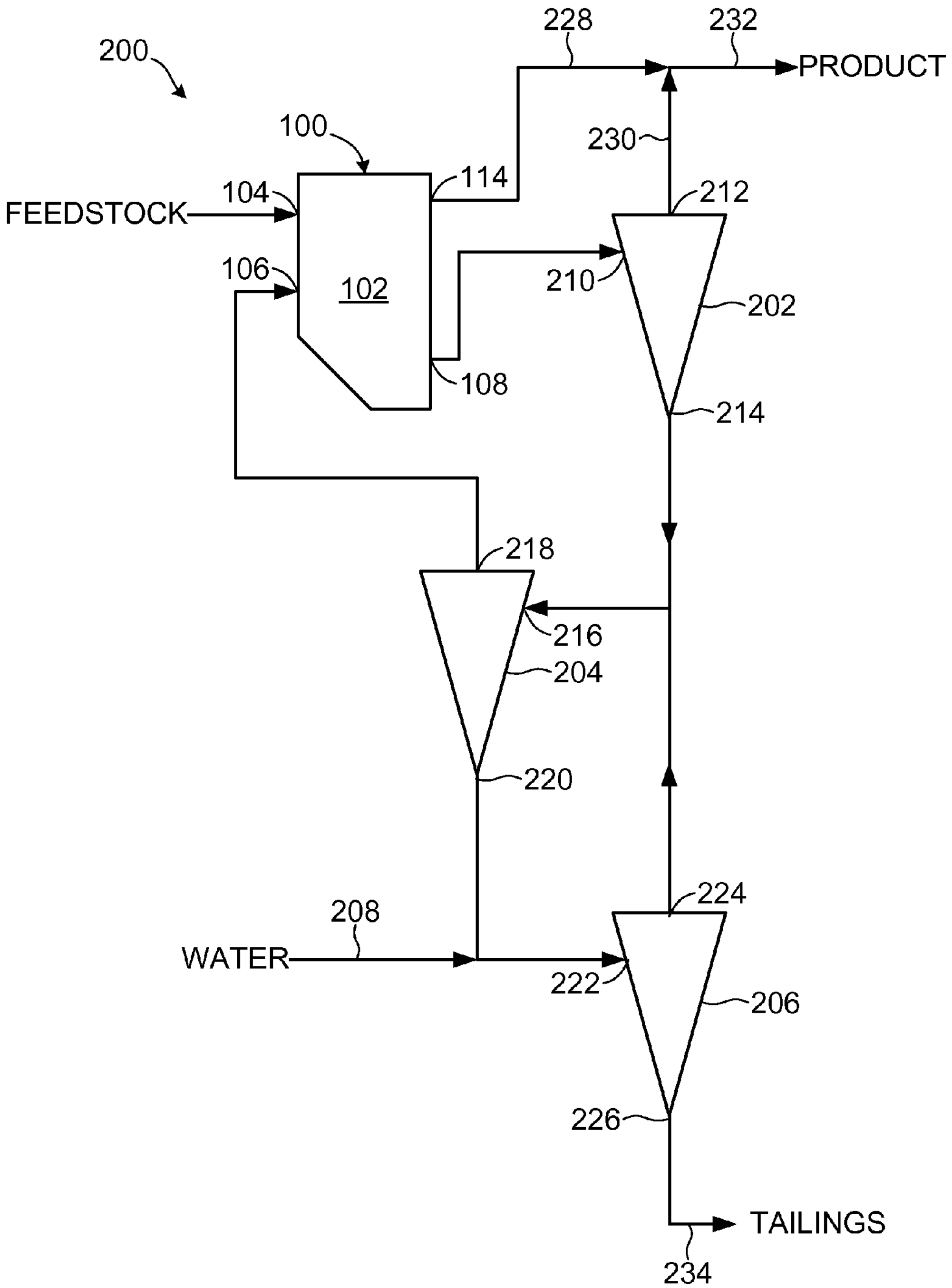
FIG. 3 is a schematic flow diagram of a system for extracting bitumen employing the pumpbox shown in FIG. 1.

Referring to FIG. 3, a flow diagram of a system for extracting bitumen from a slurry of bitumen, solids, and water according to one embodiment of the invention is shown generally at 200. The system 200 includes a plurality of generally conically shaped hydrocyclones, including a first hydrocyclone 202, a second hydrocyclone 204, and a third hydrocyclone 206. The first hydrocyclone 202 includes a feed inlet 210, an overflow outlet 212, and an underflow outlet 214. The second hydrocyclone 204 includes a feed inlet 216, an overflow outlet 218, and an underflow outlet 220. The third hydrocyclone 206 includes a feed inlet 222, an overflow outlet 224, and an underflow outlet 226.

In general, hydrocyclones operate by receiving a tangentially oriented flow at the feed inlet and a resulting circumferential flow transports heavier solid particles outwardly towards the walls of the hydrocyclone allowing lower specific gravity components and a portion of the water to be extracted as an overflow stream at the overflow outlet. The solids and a remaining portion of the water exit the hydrocyclone at the underflow outlet. Suitable hydrocyclones for the cyclone separation stages include those manufactured by FLSmidth Krebs of Tucson Ariz., USA under the trademark gMAX®. Alternatively, Cavex hydrocyclones marketed by Warman International may be used.

The system 200 further includes the pumpbox apparatus 100 shown in FIG. 1 and FIG. 2. The feedstock received at the first inlet 104 of the pumpbox apparatus 100 includes solids and/or minerals in a significant portion, by weight. For example, the feedstock may have a composition of about 5 wt % to about 15 wt % bitumen, about 40 wt % to about 70 wt % solids (including minerals), and about 30 wt % to about 75 wt % water. The pumpbox apparatus 100 generally operates as described above, and a portion of the low specific gravity bitumen in the feedstock that readily floats to the upper surface 148 of the accumulated liquid in the reservoir volume 102 overflows through the product outlet 114, and forms a first product stream 228. The remaining water, solids, and a portion of the bitumen is discharged through the discharge outlet 108 of the pumpbox apparatus 100 and forms the feed stream at the feed inlet 210 of the first hydrocyclone 202.

The first hydrocyclone 202 separates the feed received at the inlet 210 and produces a second product stream 230 of low specific gravity bitumen, water, and some fine entrained solids at the overflow outlet 212 and an underflow stream including solids, water, and a bitumen portion at the underflow outlet 214. The second product stream 230 is mixed with the first product stream 228 to produce a combined product stream 232 from the system 200, which may be further processed to separate the low specific gravity bitumen components from the water. In general mixing of the second product stream 230 and the first product stream 228 would occur in a conventional pumpbox.

The underflow at the outlet 214 is fed to the feed inlet 216 of the second hydrocyclone 204. The second hydrocyclone 204 further separates the feed into a low specific gravity overflow stream including mostly water, some bitumen, and some fine solids. The overflow outlet 218 of the second hydrocyclone 204 is fed to the second inlet 106 of the pumpbox apparatus 100, and forms the water stream inlet for the pumpbox. The underflow stream produced by the second hydrocyclone 204 at the outlet 220 and a system process water feed 208 are combined to make up the feed to the inlet 222 of the third hydrocyclone 206. The combining of these streams may occur in a conventional pumpbox, for example.

The third hydrocyclone 206 further separates the feed into an overflow stream including mostly water, some bitumen, and some fine solids which is fed through the outlet 224 to the feed inlet 216 of the second hydrocyclone 204. The underflow stream produced by the third hydrocyclone 206 at the outlet 226 forms a tailings stream 234 for the system 200. The tailings stream 234 may be further processed or diverted to a tailings pond for treatment. The feedstock thus flows serially through the first, second, and third hydrocyclones 202, 204, and 206, while the system process water feed 208 flows through the third hydrocyclone, to the second hydrocyclone, and through the pumpbox apparatus 100 to the first hydrocyclone. The system process water 208 is thus generally counter to the feedstock flow through the system 200, which serves to improve recovery of bitumen from the feedstock.

The reservoir volume 102 of the pumpbox apparatus 100 provides a capacity for buffering the flow of feedstock to the first hydrocyclone 202, thereby facilitating operation of the hydrocyclones at a desired steady-state flow rate. In one embodiment the cross sectional dimension of the reservoir volume 102 is about 7.3 meters by about 7.3 meters and the capacity of the pumpbox is selected to accommodate flows of between about 1400 kg/m3 to about 1650 kg/m3 with a residence time of about 30 seconds to about several minutes. For illustrative purposes, in one arrangement, the retention time is about 1 minute. Advantageously, the pumpbox apparatus 100 further facilitates collection of a bitumen portion, in the form of aerated bitumen froth, that readily floats to the surface of the accumulated liquid in the reservoir volume 102. The first, second, and third hydrocyclones 202, 204, and 206 thus operate on feed streams having bitumen requiring more aggressive processing to separate low specific gravity bitumen from the solids.

Advantageously, in the event of a failure of a pump, such as the pump 160 shown in FIG. 2, the first liquid level in the reservoir volume 102 of the pumpbox apparatus 100 will rise and overflow at the inlet 112 of the collector 110, facilitating diversion of the feedstock through the outlet 114 to a safe location. Under these conditions solids will accumulate in the reservoir volume, and the overflow at the inlet 112 will include water, bitumen and some solids.

In other embodiments, the configuration of the system 200 may be changed to suit a particular feedstock. For example, where it is desired to process a feedstock having a lower portion of solids, the third hydrocyclone 206 may be omitted, in which case the system process water may be provided to feed inlet 216 of the second hydrocyclone 204, and the underflow 220 of the second hydrocyclone forms the tailings stream for the system 200.

The pumpbox apparatus 100 may also be used in other applications that generally require blending of two or more streams having components of different specific gravity and where it is desired to collect a low specific gravity portion that readily floats upwardly within the accumulated liquid.

While specific embodiments of the invention have been described and illustrated, such embodiments should be considered illustrative of the invention only and not as limiting the invention as construed in accordance with the accompanying claims.

What is claimed is:

1. A pumpbox apparatus for processing a feedstock stream, the apparatus comprising:

a reservoir having a first inlet for receiving the feedstock stream and a second inlet for receiving a water stream, the reservoir being in communication with a discharge outlet disposed to discharge accumulated liquid from the reservoir, the reservoir being operable to accumulate the feedstock stream and the water stream to a first liquid level in the reservoir while withdrawing a discharge stream through the discharge outlet to cause a flow of liquid through the pumpbox, the first inlet being located above the second inlet and defining a first flow region between the first inlet and the second inlet, the second inlet being located above the discharge outlet and defining a second flow region between the second inlet and the discharge outlet, a first flow velocity in the first flow region being lower than a second flow velocity in the second flow region to facilitate flotation of a low specific gravity portion of the feedstock through the first flow region toward an upper surface of the liquid accumulated in the reservoir; and a collector for collecting at least a portion of the low specific gravity portion from an upper surface of the accumulated volume when the first liquid level is above the first inlet.

2. The apparatus of claim 1 further comprising a controller for controlling a flow rate through the discharge outlet to maintain the first liquid level at a level between the first inlet and a high liquid level associated with a maximum operating level for the reservoir.

3. The apparatus of claim 2 wherein the collector is operably configured to collect at least a portion of the low specific gravity portion from an upper surface of the accumulated volume when the first liquid level reaches a high liquid level.

4. The apparatus of claim 2 wherein the collector comprises a launder having an inlet disposed in the reservoir at the high liquid level for receiving an overflow of the low specific gravity portion from the reservoir.

5. The apparatus of claim 2 wherein the reservoir is selected to maintain a retention time of feedstock and water in the pumpbox of about 1 minute.

6. The apparatus of claim 1 further comprising a discharge pump in communication with the discharge outlet for withdrawing the discharge stream from the discharge outlet.

7. The apparatus of claim 6 wherein the discharge pump is operably configured to discontinue operation when the liquid level reaches a low liquid level.

8. The apparatus of claim 6 further comprising a controller operably configured to control operation of the discharge pump in response to receiving a liquid level signal representing an accumulation level of liquid in the reservoir.

9. The apparatus of claim 1 wherein the feedstock stream comprises an aerated bitumen froth having a density in the range of about 600 $kg/m^3$ to about 1000 $kg/m^3$.

10. The apparatus of claim 9 wherein the feedstock stream comprises water and solids.

11. The apparatus of claim 1 wherein the water stream comprises a re-circulated water stream.

12. The apparatus of claim 11 wherein the re-circulated water stream comprises residual bitumen and solids.

13. The apparatus of claim 1 wherein said second inlet is disposed to cause solids that settle out of the accumulated liquid volume to be dispersed toward the discharge outlet for discharge in the discharge stream.

14. The apparatus of claim 13 wherein said second inlet is oriented to direct the water stream received at the second inlet generally towards the discharge outlet.

15. The apparatus of claim 13 wherein the pumpbox comprises a base having portion that is inclined to direct solids that settle out of the accumulated liquid volume toward the discharge outlet for discharge in the discharge stream.

16. The apparatus of claim 1 wherein a density of the discharge stream is between about $122\times10^1$ and about $128\times10^1$ $kg/m^3$.

17. The apparatus of claim 1 wherein the flow velocity in the first flow region is less than $5\times10^{-2}$ meters per second.

18. A pumpbox apparatus for processing a feedstock stream, the apparatus comprising:

a reservoir having a first inlet for receiving the feedstock stream and a second inlet for receiving a water stream, the reservoir being in communication with a discharge outlet disposed to discharge accumulated liquid from the reservoir, the reservoir being operable to accumulate the feedstock stream and the water stream to a first liquid level in the reservoir while withdrawing a discharge stream through the discharge outlet to cause a flow of liquid through the pumpbox, the first inlet being located above the second inlet and defining a first flow region between the first inlet and the second inlet, the second inlet being located above the discharge outlet and defining a second flow region between the second inlet and the discharge outlet, a first flow velocity in the first flow region being lower than a second flow velocity in the second flow region to facilitate flotation of a low specific gravity portion of the feedstock through the first flow region toward an upper surface of the liquid accumulated in the reservoir; and means for collecting at least a portion of the low specific gravity portion from an upper surface of the accumulated volume when the first liquid level is above the first inlet.

19. The apparatus of claim 18 further comprising means for controlling a flow rate through the discharge outlet to maintain the first liquid level at a level between the first inlet and a high liquid level associated with a maximum operating level for the pumpbox.

20. The apparatus of claim 19 wherein said means for collecting comprises means for collecting at least a portion of the low specific gravity portion from an upper surface of the accumulated volume when the first liquid level reaches a high liquid level.

21. The apparatus of claim 19 wherein said means for controlling comprises means for controlling a flow rate through the discharge outlet to maintain a retention time of the feedstock stream and water stream in the reservoir of about 1 minute.

22. The apparatus of claim 18 wherein the feedstock stream comprises an aerated bitumen froth having a density in the range of about 600 kg/m3 to about 1000 kg/m3.

23. The apparatus of claim 22 wherein the feedstock stream further comprises water and solids.

24. The apparatus of claim 18 wherein the water stream comprises a re-circulated water stream.

25. The apparatus of claim 24 wherein the re-circulated water stream comprises at least one of residual bitumen and solids.

26. The apparatus of claim 18 further comprising means for causing solids that settle out of the accumulated liquid volume to be dispersed toward the discharge outlet for discharge in the discharge stream.

27. The apparatus of claim 18 wherein a density of the discharge stream is between about $122\times10^1$ and about $128\times10^1$ $kg/m^3$.

28. The apparatus of claim 18 wherein the first flow velocity is less than about $5\times10^{-2}$ meters per second.

29. A method for regulating flow through a pumpbox having a reservoir in communication with a discharge outlet disposed to discharge accumulated liquid from the reservoir, the method comprising:

receiving a feedstock stream at a first inlet of the reservoir;

receiving a water stream at a second inlet of the reservoir;

accumulating the feedstock stream and the water stream to a first liquid level in the reservoir while withdrawing a discharge stream through the discharge outlet to cause a flow of liquid through the pumpbox, the first inlet being located above the second inlet and defining a first flow region between the first inlet and the second inlet the second inlet being located above the discharge outlet and defining a second flow region between the second inlet and the discharge outlet, a first flow velocity in the first flow region being lower than a second flow velocity in the second flow region to facilitate flotation of a low specific gravity portion of the feedstock through the first flow region toward an upper surface of the liquid accumulated in the reservoir; and collecting at least a portion of the low specific gravity portion from an upper surface of the accumulated volume when the first liquid level is above the first inlet.

30. The method of claim 29 further comprising controlling a flow rate through the discharge outlet to maintain the first liquid level at a level between the first inlet and a high liquid level associated with a maximum operating level for the reservoir.

31. The method of claim 30 wherein collecting comprises collecting at least a portion of the low specific gravity portion from an upper surface of the accumulated volume when the first liquid level reaches the high liquid level.

32. The method of claim 30 wherein collecting comprises causing the low specific gravity portion to overflow into a launder having an inlet disposed in the reservoir at the high liquid level.

33. The method of claim 29 wherein withdrawing the discharge stream comprises operating a discharge pump in communication with the discharge outlet.

34. The method of claim 33 further comprising discontinuing operation of the discharge pump when the liquid level reaches a low liquid level.

35. The method of claim 33 further comprising controlling operation of the discharge pump in response to receiving a liquid level signal representing an accumulation level of liquid in the reservoir.

36. The method of claim 29 wherein the feedstock stream comprises an aerated bitumen froth having a density in the range of about 600 kg/m3 to about 1000 kg/m3.

37. The method of claim 36 wherein the feedstock stream comprises water and solids.

38. The method of claim 29 wherein receiving the water stream comprises receiving a re-circulated water stream.

39. The method of claim 38 wherein the re-circulated water stream comprises residual bitumen and solids.

40. The method of claim 29 further comprising causing solids that settle out of the accumulated liquid volume to be dispersed toward the discharge outlet for discharge in the discharge stream.

41. The method of claim 40 wherein causing solids that settle out of the accumulated liquid volume to be dispersed comprises directing the water stream received at the second inlet generally towards the discharge outlet.

42. The method of claim 29 wherein a density of the discharge stream is between about $122\times10^1$ and about $128\times10^1$ $kg/m^3$.

43. The method of claim 29 wherein the first flow velocity is less than $5\times10^{-2}$ meters per second.

44. A system for extracting bitumen from a feedstock, the system comprising:

a pumpbox comprising a reservoir having a first inlet for receiving a feedstock stream and a second inlet for receiving a water stream, the reservoir being in communication with a discharge outlet disposed to discharge accumulated liquid from the reservoir, the reservoir being operable to accumulate the feedstock stream and the water stream to a first liquid level in the reservoir while withdrawing a discharge stream through the discharge outlet to cause a flow of liquid through the pumpbox, the first inlet being located above the second inlet and defining a first flow region between the first inlet and the second inlet, the second inlet being located above the discharge outlet and defining a second flow region between the second inlet and the discharge outlet, a first flow velocity in the first flow region being lower than a second flow velocity in the second flow region to facilitate flotation of a low specific gravity portion of the feedstock through the first flow region toward an upper surface of the liquid accumulated in the reservoir;

a first hydrocyclone having a feed inlet, an overflow outlet for producing a first product stream, and an underflow outlet, the feed inlet of the first hydrocyclone being in communication with the discharge outlet of the pumpbox for receiving the discharge stream from the pumpbox;

a second hydrocyclone having a feed inlet, an overflow outlet, and an underflow outlet for producing a first tailings stream, the feed inlet of the second hydrocyclone being in communication with the underflow outlet of the first hydrocyclone, the overflow outlet of the second hydrocyclone being in communication with the second inlet of the pumpbox for providing the water stream to the pumpbox; and wherein the pumpbox further comprises a collector for collecting at least a portion of the low specific gravity bitumen portion from an upper surface of the accumulated volume when the first liquid level is above the first inlet to produce a second product stream, the second product stream being combined with the first product stream to produce a system product stream.

45. The system of claim 44 further comprising a third hydrocyclone having a feed inlet, an overflow outlet, and an underflow outlet, the feed inlet of the third hydrocyclone being in communication with the underflow outlet of the second hydrocyclone for receiving the first tailings stream, the third hydrocyclone being operable to produce a second tailings stream at the underflow outlet of the second hydrocyclone, the overflow outlet of the third hydrocyclone being in communication with the feed inlet of the second hydrocyclone to provide an additional feed to the second hydrocyclone.

* * * * *